UNITED STATES PATENT OFFICE.

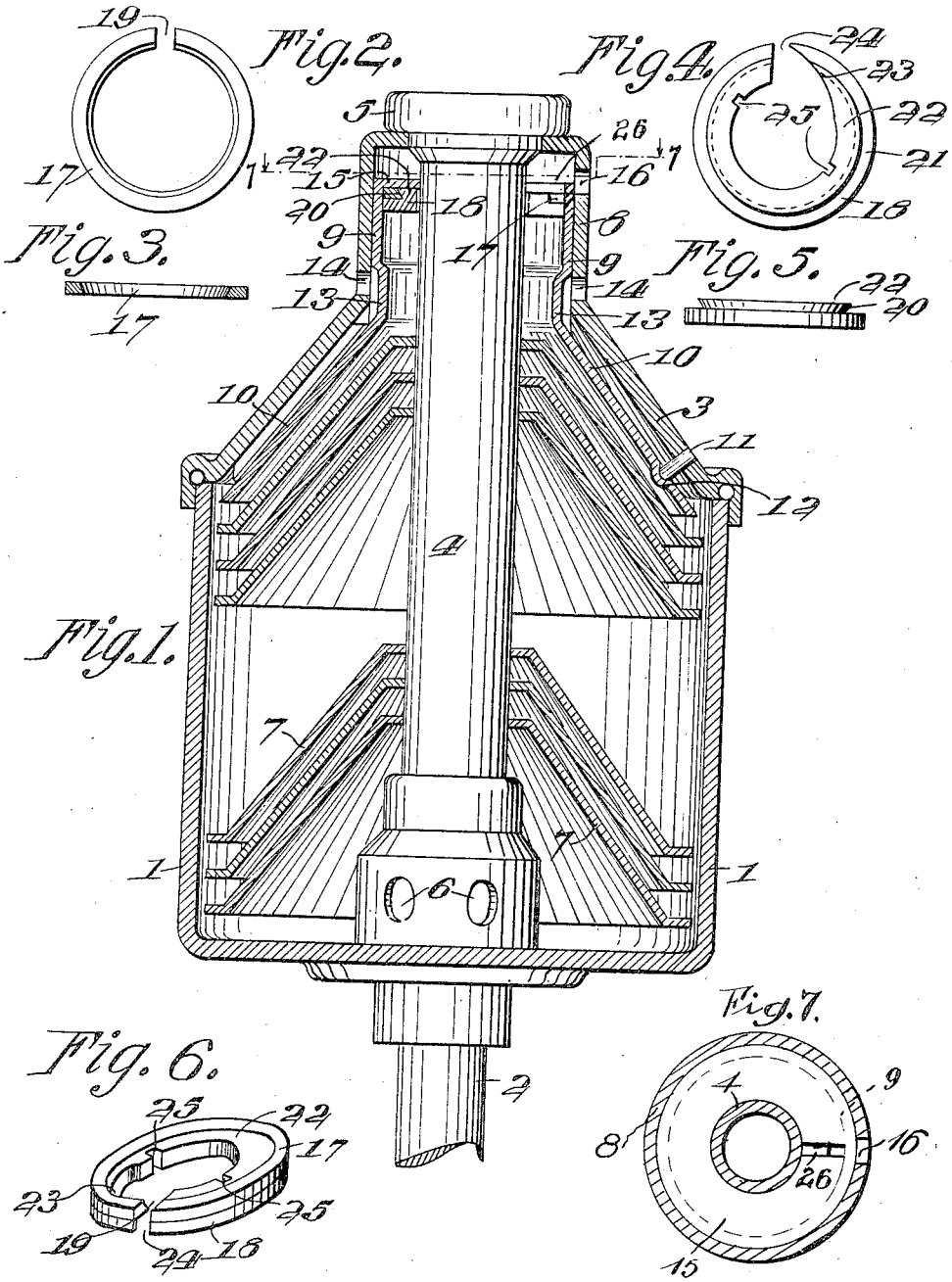

EDGERLY R. BAILEY AND MYRON A. GANIARD, OF CLARINDA, IOWA.

CREAM-SEPARATOR.

934,706.  Specification of Letters Patent.  Patented Sept. 21, 1909.

Application filed July 9, 1908. Serial No. 442,711.

*To all whom it may concern:*

Be it known that we, EDGERLY R. BAILEY and MYRON A. GANIARD, citizens of the United States, residing at Clarinda, in the county of Page and State of Iowa, have invented certain new and useful Improvements in Cream-Separators; and we do declare the following to be a full, clear, and exact description of the invention, such as will enable others skilled in the art to which it appertains to make and use the same.

Our invention relates to cream separators and particularly to that type using centrifugal force to separate the heavier particles of the milk or the watery constituent thereof from the fatter constituent or cream.

It is the object of the invention to provide a separator of this type which will have means for modifying the density of the cream thus permitting the skimming of cream of a high or low fat percentage as the operator may desire.

A further object of the invention is to provide an attachment which may be used in connection with skimming cones of centrifugal separators for regulating the density of the cream.

With the foregoing and other objects in view, the invention consists of certain novel features of construction, combination and arrangement of parts, as will be more fully described and particularly pointed out in the appended claims.

In the drawings, Figure 1 is a vertical sectional view of the cream separator bowl with our attachment applied thereto; Fig. 2 is a top plan view of the supporting ring; Fig. 3 is a sectional view thereof; Fig. 4 is a top plan view of the adjusting ring; Fig. 5 is a side elevation thereof; Fig. 6 is a detailed perspective of these rings as they are positioned with respect to each other when located in the skimming cone and Fig. 7 is a horizontal section on the line 7—7 of Fig. 1.

Referring more especially to the drawing 1 represents the separator bowl which is mounted upon the vertical shaft 2 and is provided with the cap or head 3. The milk enters the bowl as is usual through the central tube 4 which is provided at its top with a threaded cap 5 which holds the head 3 down upon the bowl 1.

The bottom of the tube 4 is provided with the milk outlet openings 6 and the tube is surrounded by the usual liner plates 7. As is usual the head is provided with a cylindrical upstanding portion 8 in which the cylindrical end 9 of the skimming cone 10 is located. This skimming cone is seated within the head 3 by means of a pin 11 passing therethrough and engaging a socket or seat 12 formed in the cone. The upper end of the cone adjacent the cylindrical portion 8 of the cap or head is offset as at 13 to permit access to the milk outlet openings 14 which may be of any size or number according to the conditions to be observed. The upper end of the cone is provided with a horizontal flange 15 which surrounds the tube 4 and forms an abutment for the adjusting rings. The flange 15 is provided with a suitable slot 26 which is adapted to communicate with the cream port 16. The adjusting rings comprise a pair of split rings 17 and 18, the former of which has its slot 19 registering with one of the openings in the flange 15 and with the cream port 16. The ring 17 is formed by beveling its inner periphery as shown in Fig. 3 so as to engage the under cut shoulder 20 of the ring 18. This ring 18 is provided with an outstanding flange 21 adapted to receive the ring 17 and an upstanding rim 22 upon which the shoulder 20 is formed. One end of the ring is sheared off or cut away as at 23 and the opposite end is squared as shown in Figs. 4 and 6. The ends of the ring which are separated form a passage way or slot 24 which is normally adapted to register with the slot 19 in the ring 17 and with the cream port 16. We preferably provide suitable notches 25 which may be engaged by a spanner or other wrench to adjust the ring 18 upon the ring 17.

In operation the ring 17 is secured within the upper end of the skimming cone 10 so as to have its slot 19 in register with the cream port 16. By rotating the adjusting ring thereon, it will be seen that the opening or exit to the port 16 may be more or less restricted. When the ring is adjusted so as to narrow the spaces between the inner periphery of the skimming cone and the center of the bowl, the cream obtained will be thicker and richer in fat. It will be noticed that there will be a great latitude in the adjustment of this ring thereby permitting the skimming of the cream of a high or low fat percentage as may be desired by the operator.

From the foregoing description taken in connection with the accompanying drawings, the construction and operation of the invention will be readily understood without requiring a more extended explanation.

Various changes in the form, proportion and the minor details of construction may be restored to without departing from the principle or sacrificing any of the advantages of the invention, as defined in the appended claims.

We claim as our invention:—

1. In a centrifugal separator, a skimming cone having a closed neck, and a pair of interconnected rings carried in the neck to determine the quality of cream obtained.

2. In a cream separator, a skimming cone having a closed neck, and a pair of interconnected adjustable rings carried in the neck for determining the quality of cream obtained.

3. In a cream separator, a casing having a cream port, a skimming cone having a closed neck and an opening therein communicating with the cream port, and a pair of adjustable rings acting in conjunction with said opening and carried by the skimming cone for determining the quality of cream obtained.

4. An attachment for the outer end of skimming cones which comprises a pair of interconnected adjustable rings, one of which is secured to the cone.

5. In a cream separator, the combination with a separator bowl having a cream port, of a skimming cone having an opening in communication with said cream port, a slotted ring having its slot in register with openings in the skimming cone and means carried by said ring for controlling said openings.

6. In a cream separator, the combination with a separator bowl of a cream port, of a skimming cone having an opening communicating with said cream port, a ring having a slot therein communicating with said opening and port, and a split ring having a sheared end adapted to be secured to said first mentioned ring to control said openings.

In testimony whereof we have hereunto set our hands in presence of two subscribing witnesses.

EDGERLY R. BAILEY.
MYRON A. GANIARD.

Witnesses:
 MINNIE POTTS,
 B. C. HOSKINS.